United States Patent [19]

Wolter

[11] 4,406,140
[45] Sep. 27, 1983

[54] ANTI-THEFT DEVICE FOR AUTOMOBILE WHEELS

[75] Inventor: Heinz Wolter, Kürten, Fed. Rep. of Germany

[73] Assignee: DOM-Sicherheitstechnik GmbH & Co. KG, Brühl, Fed. Rep. of Germany

[21] Appl. No.: 260,640

[22] Filed: May 4, 1981

[30] Foreign Application Priority Data

May 8, 1980 [DE] Fed. Rep. of Germany ....... 3017630

[51] Int. Cl.³ .................. E05B 11/00; E05B 35/14; E05B 65/00; F16B 41/00
[52] U.S. Cl. ................................. 70/231; 70/232; 70/369; 70/389
[58] Field of Search ................ 70/231, 232, 370, 389, 70/364 R, 165, 369, 371, 367

[56] References Cited

U.S. PATENT DOCUMENTS

| | | | |
|---|---|---|---|
| 1,606,864 | 11/1926 | Aldeen | 70/370 X |
| 1,625,901 | 4/1927 | Lay | 70/231 X |
| 1,937,848 | 12/1933 | Shinn | 70/232 X |
| 2,023,208 | 12/1935 | Olson | 70/364 R X |
| 2,469,973 | 5/1949 | Malluk | 70/232 |
| 2,534,446 | 12/1950 | Howard | 70/231 |
| 2,775,884 | 1/1957 | Fresnard et al. | 70/364 R |
| 2,803,959 | 8/1957 | Schlage | 70/367 X |
| 3,060,786 | 10/1962 | Flower | 70/231 X |
| 3,535,898 | 10/1970 | Allport | 70/231 |
| 3,540,245 | 11/1970 | Pope | 70/231 |
| 4,028,917 | 6/1977 | Schlage | 70/389 |
| 4,057,985 | 11/1977 | Stahl | 70/231 |
| 4,136,541 | 1/1979 | Gramlich | 70/231 |

FOREIGN PATENT DOCUMENTS

| | | | |
|---|---|---|---|
| 2301920 | 7/1974 | Fed. Rep. of Germany | 70/231 |
| 2825486 | 7/1979 | Fed. Rep. of Germany | 70/232 |
| 668964 | 7/1929 | France | 70/232 |
| 411668 | 4/1945 | Italy | 70/231 |
| 1027382 | 4/1966 | United Kingdom | 70/370 |
| 1198922 | 7/1970 | United Kingdom | 70/232 |
| 1463812 | 2/1977 | United Kingdom | 70/371 |
| 1564287 | 4/1980 | United Kingdom | 70/231 |

Primary Examiner—Cornelius J. Husar
Assistant Examiner—Carl F. Pietruszka
Attorney, Agent, or Firm—Martin A. Farber

[57] ABSTRACT

Anti-theft device for nuts/screws of automobile wheels, comprising a barrel (10) rotatably subassembled with a lock cylinder plug (18) the tumblers (24) of which are placed in position by simple insertion of the key (23), which key, however, once inserted and turned, cannot be withdrawn inasmuch as a projection (28) on the key (23) then lies behind a shoulder (20) on the barrel. This subassembly may be rotatably locked upon the fastener element or removed therefrom using but one hand.

12 Claims, 10 Drawing Figures

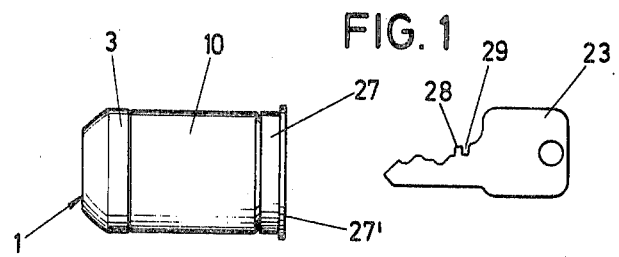
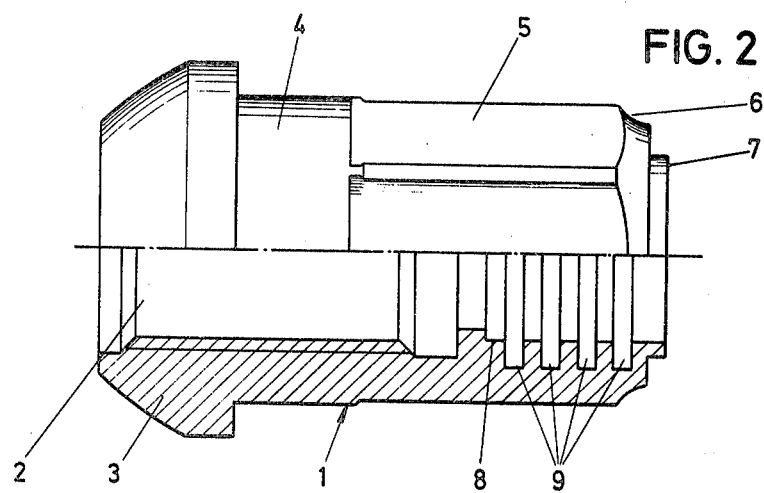
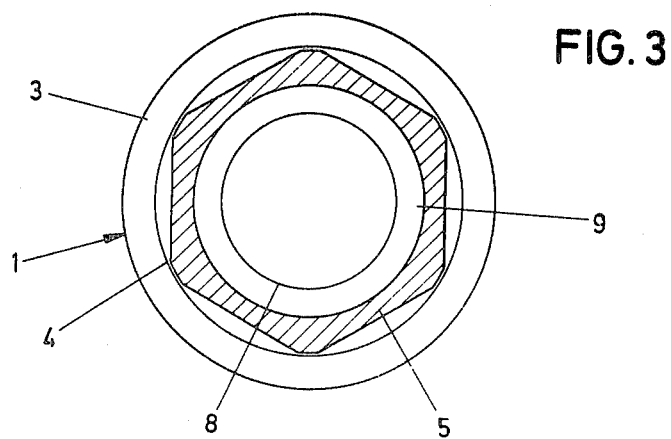

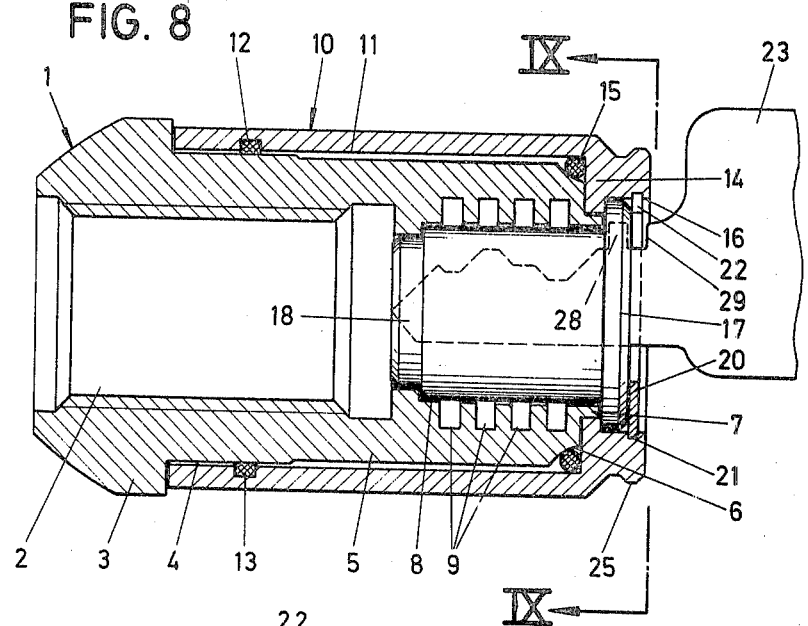
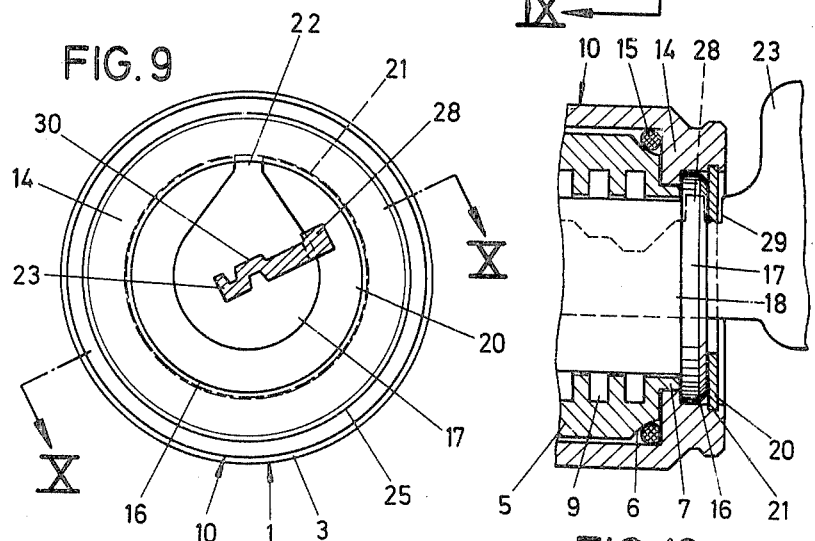

ANTI-THEFT DEVICE FOR AUTOMOBILE WHEELS

The present invention relates to a device for preventing the theft of automobile wheels having a barrel which extends over a polygonal head of a wheel nut, within which barrel there is arranged a lock cylinder plug the tumblers of which projecting beyond the cylindrical surface of the plug and entering in an anti-theft position into annular grooves formed in the inner wall of the polygonal head, can be brought by the key into a position in which they are retracted from the annular grooves.

One such device is known from West German OS No. 2 301 920 in which the collar of the lock cylinder is provided on its inner side with a radially directed extension which engages into a recess in the barrel which is adapted and shaped thereto. This coupling is necessary so that, upon removal of the barrel and the lock cylinder, the key which has been introduced into the center of the lock cylinder will, upon its turning motion, move the tumblers out of their position of engagement with the annular grooves on the inner wall of the polygonal head. Upon turning, to be sure, the barrel must be held fast on the other hand so that when the key is turned the corresponding control of the tumblers can take place.

The object of the present invention is to provide a device of the afore-mentioned type which is simple to manufacture and more advantageous in use, in that the mounting and removal of the barrel and lock cylinder plug can be easily effected with one hand.

This object is aided in its solution in the manner that the key (23), which by mere insertion positions the tumblers (24) which are seated in the lock cylinder plug which is arranged rotatably with respect to the barrel (10), has a projection (28) which lies in the plane of the key slot (30) in which, when the key (23) is inserted and turned out of a basic position, moves behind a shoulder of the barrel (10).

As a result of this arrangement there is provided a device of the afore-mentioned type of high value in use for preventing the theft of automobile wheels. The barrel and the lock cylinder plug form a structural unit which, by means of the key introduced into the lock cylinder plug, can be coordinated in a very simple manner with the polygonal head of the wheel nut and also removed. Due to the combining of the barrel and the lock cylinder plug into a single structural unit, parts will be less easily lost upon mounting and removal. If the barrel is pushed together with the lock cylinder plug, onto the polygonal head, the key is first of all to be inserted into the lock cylinder plug, with the lock cylinder plug in its basic position. After pushing on the barrel and the removal of the key, the barrel together with the lock cylinder plug is already held in turnable but non-removable manner on the polygonal head. If the barrel is to be removed together with the lock cylinder plug, the lock cylinder plug must be brought into the basic position by means of the key. Thereupon, the key is turned so that its projection comes behind the shoulder of the barrel. A pull on the key then carries the barrel along with it and withdraws it from the polygonal head of the wheel nut. This can very easily be done with a single hand and can be effected by a layman without any great difficulty. Since barrel and lock cylinder plug are combined to form a single structural unit, there is also less danger of dirtying oneself when removing the barrel.

The annular shoulder is formed of a spring lock washer (20) which is snapped into an annular groove (21) of the barrel (10) and locks the cylinder plug (18) in the barrel (10) in a manner so as to prevent it from being pulled out, the lock washer having a transverse slot (22). This provides a most favorable construction for the structural unit comprising the barrel and the lock cylinder plug. The lock washer which serves for axially securing the inserted lock cylinder plug in place is at the same time used to form the shoulder. The transverse slot in the lock washer which is in any event present permits passage of the projection of the key, upon the insertion of the latter into the lock cylinder plug.

In order that the lock cylinder plug remains substantially protected against dirt, the front surface of the barrel (10) is covered by a protective cap (27) which can be clipped thereon.

The sealing O-rings (13, 15) are provided on the inner wall of the barrel (10), the rings resting respectively against a front fillet (6) of the polygonal head (5) and against a cylindrical section (4) on the other side of the polygonal head (5). This provides further assurance against dirtying. Therefore no dirtying can take place from the direction of the polygonal head.

In order to achieve a stable structural shape which is favorable from the standpoint of mounting technique, the polygonal head (5) passes at its free end into a protruding collar (7) which extends into an annular opening (19) which is formed by the side flank (14') of a shoulder (14) of the barrel (10) and the cylindrical surface M of the cylinder plug (18).

One preferred embodiment of the invention will be described below with reference to FIGS. 1 to 10, in which:

FIG. 1 is a view on approximately true scale of the assembled device, together with the key;

FIG. 2 shows the nut partly in elevation and partly in longitudinal section;

FIG. 3 is a cross section through the polygonal head in the region of an annular groove;

FIG. 8 is a longitudinal section which corresponds to FIG. 6 but with the protective cap removed and the key inserted;

FIG. 9 is a section along the line IX—IX of FIG. 8 but with the key and thus the lock cylinder plug turned out of the basic position, and FIG. 10 is a section along the line X—X of FIG. 9.

Figure 4:
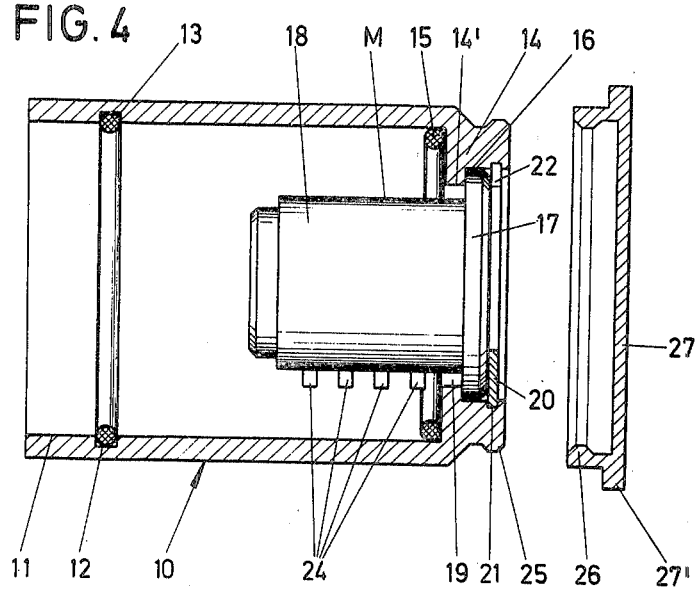
FIG. 4 is a longitudinal section through the barrel which receives the lock cylinder plug together with the corresponding protective cap.
Figure 5:
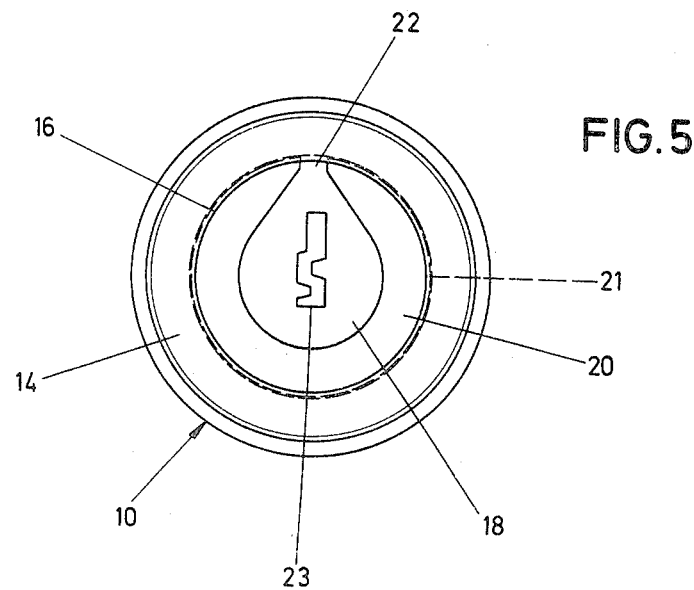
FIG. 5 is an end view of the barrel with the lock cylinder plug in its basic position.

The device has a wheel nut 1 which, via its internal thread 2, fits over a stud, not shown. By means of a thickened, barrel-shaped collar 3, the nut 1 engages in centering fashion in the cavity provided on the wheel. Adjoining the collar 3 is a cylindrical section 4 which passes into the polygonal head 5. The latter is a hexagon head. The front side of the polygonal head 5 forms a fillet 6. On the other side of this fillet the polygonal head 5 then has a protruding collar 7.

In the extension of the inner thread 2 there is provided, within the nut 1, a cavity 8 from which, in the embodiment shown by example, there extend four parallel annular grooves 9 which are equally spaced apart.

The barrel, which is to be placed on the polygonal head 1 bears the reference number 10. Its inside diameter is adapted to the outside diameter of the cylindrical section 4 and of the corners of the polygonal head 5. At its insertion-side end, there extends from the barrel cavity 11 an annular groove 12 in which a sealing O-ring 13 lies. At the other end of the barrel cavity 11 there is a radially inwardly directed projection forming a shoulder 14 against which another sealing O-ring 15 rests. The sealing function can also be obtained by a single sealing ring which extends over the entire length between the sealing points 13 and 15 and has a bead which engages into the annular groove 12. The shoulder 14 forms a mounting opening 16 for the collar 17 of a lock cylinder plug 18. Between the cylindrical surface M of said plug and a flank 14' of the shoulder 14 there is formed an annular opening 19.

A split ring comprising a lock washer 20 serves to hold the lock cylinder plug 18 in axially non-displaceable manner within the barrel. The lock washer is recessed, on the front of the collar 17, in an annular groove 21 of the shoulder 14 which extends from the mounting opening 16. The lock washer has a recess transverse slot 22 whose minimum width is somewhat larger than the thickness of the key.

When the key 23 is not introduced, the tumblers 24 protrude beyond the cylindrical surface of the lock cylinder plug 18.

The barrel 10 forms, at its free end, an annular bead 25 which cooperates with a catch shoulder 26 of a protective cap 27 which is of dish shape in cross section. The cap is provided with a grip collar 27' on its edge.

The key 23 for the lock cylinder plug 18 is provided on its narrow edge adjacent the tumbler cutouts with a notch 29 which forms a projection 28. When the key 23 is inserted into the key slot 30, the notch 29 is on a line with the lock washer 20.

Figure 6:
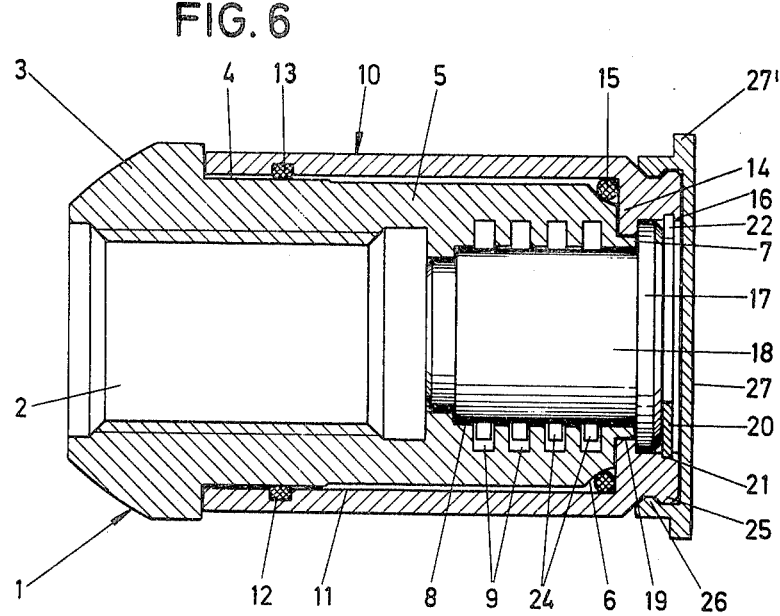
FIG. 6 is a longitudinal central section through the assembled device with the protective cap in position.
Figure 7:
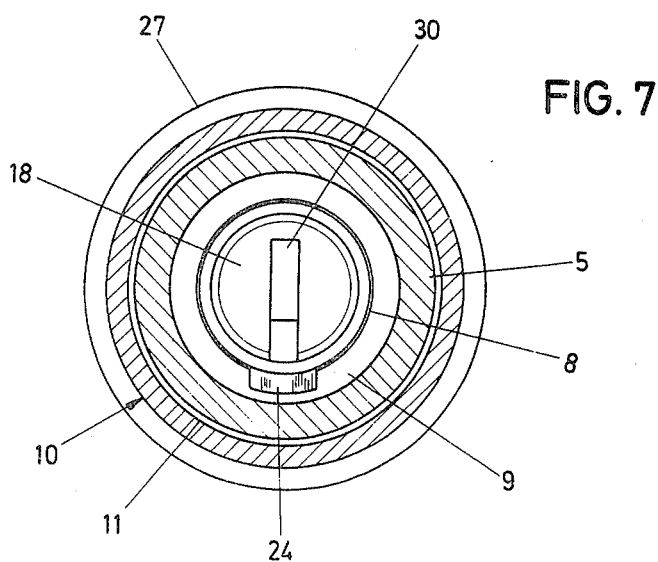
FIG. 7 is a cross section through the device in the region of an annular groove with a tumbler present therein.

If the wheel nut 1 has been screwed onto a stud and is to be secured against unscrewing, the barrel 10 is pushed over the polygonal head with the key 23 inserted into the lock cylinder plug 18. This is possible since in such case the tumblers 24 have the position shown in FIG. 8. The movement of the barrel 10 is limited by its front edge coming against the collar 3 and by the shoulder 14 of the barrel 10 which comes against the free end of the polygonal head 5. In this position, the sealing O-ring 13 surrounds the cylindrical section 4 on the other side of the polygonal head 5 while the other sealing O-ring 15 lies in the front fillet 6 of the polygonal head 5. The protruding collar 7 of the polygonal head 5 is then introduced into the annular opening 19 between the side flank 14' of the shoulder 14 and the cylindrical surface M of the lock cylinder plug 18. Furthermore, the tumblers 24 lie in the planes of annular grooves 9 of the polygonal head 5. If the key 23 is now withdrawn from the key slot 30, the tumblers 24 are led beyond the cylindrical surface M of the lock cylinder plug 18 and extend into the annular grooves 9. The barrel 10 can now be turned together with the lock cylinder plug 18 but it cannot be withdrawn from the polygonal head 5. It is also possible to turn the lock cylinder plug 18 with respect to the barrel 10. The protective cap 27 can now be placed on, its clip shoulder 26 extending over the annular bead 25 of the barrel 10; see FIG. 6.

If the barrel 10 together with lock cylinder plug 18 are to be removed, the protective cap 27 is first of all taken off. Thereupon the key 23 is inserted into the key slot 30 of the cylinder plug 18. The complete insertion of the key is possible only in the basic position of the lock cylinder plug in which the key slot 30 is aligned with the transverse slot 22 of the lock washer 20. Only then does the projection 28 go behind the plane of the lock washer 20 and the shoulder formed by it. The key 23 is now turned together with the lock cylinder plug 18, for instance into the position shown in FIGS. 9 and 10. The projection 28 thus lies behind the shoulder and the lock washer 20. If the key 23 is now pulled, the projection 28 carries the barrel 10 along with it via the shoulder-lock washer 20 and pulls the barrel from the polygonal head. This operation, as well as the placing-on of the barrel, can easily be effected with the use of a single hand.

Instead of development as a nut the threaded fastener element may also be developed as a wheel bolt.

I claim:

1. In a device for preventing theft of automobile wheels having a barrel which extends over a polygonal head of a threaded wheel fastener part, within which barrel there is arranged a lock cylinder plug, the tumblers of which projecting beyond a cylindrical surface of the lock cylinder plug and in an anti-theft position entering into annular grooves formed in an inner wall of the polygonal head, can be brought by a key into a position in which the tumblers are retracted from the annular grooves, the improvement wherein
   said tumblers are seated in the lock cylinder plug,
   said barrel is formed with a bearing opening,
   key means are provided for positioning said tumblers into said position in which the tumblers are retracted from the annular grooves by insertion into a key slot of said lock cylinder plug,
   said lock cylinder plug is formed with a collar which is rotatably mounted in the bearing opening of said barrel,
   a ring substantially closes said bearing opening and forms a shoulder connected to said barrel and disposed in front of and overlapping said collar of said lock cylinder plug, said ring is formed with a radial recess,
   said key means is formed with a projection which lies in a plane of the key slot when the key is inserted therein, said projection is at most as large as said recess in width and radially outermost extent,
   said projection is disposed behind said shoulder constituting means for pulling out the ring and the barrel connected thereto from the wheel fastener part by pulling said key means after said key means is inserted into said key slot, passed through said recess with the key slot in a basic position aligned with said recess and turned out of said basic position, and
   at least one O-ring is disposed on an inner wall of said barrel between and acting against said barrel and said wheel fastener part.

2. The device according to claim 1, wherein said barrel is formed with an annular recess, the shoulder is annular and is formed of a spring lock washer which is snapped into said annular recess of the barrel and locks said lock cylinder plug in said barrel in a manner so as to prevent said cylinder plug from being pulled out, and said lock washer defines a transverse slot constituting said recess.

3. The device according to claim 1, wherein said wheel fastener part is formed with a front fillet of said polygonal head and a cylindrical section on opposite sides of said polygonal head, and sealing O-rings are disposed on the inner wall of said barrel and include said at least one O-ring, said O-rings engage respectively against said front fillet of said polygonal head and against said cylindrical section.

4. The device according to claim 1, wherein said barrel forms another shoulder, said another shoulder defines a side flank of the barrel, said side flank is spaced from said cylindrical surface of said lock cylinder plug and defines an annular opening therebetween, and the polygonal head extends at a free end thereof into a protruding collar, the latter extends into said annular opening.

5. The device according to claim 1, wherein said ring is a split ring and said recess is a slot in said split ring.

6. The device according to claim 1, wherein said barrel has a radially inwardly directed projection defining a rear portion of said bearing opening and engaging behind said collar of said lock cylinder plug, said barrel and said lock cylinder plug constituting a structural unit removed together from said nut via said key means and said ring.

7. The device according to claim 6, wherein said collar is held axially non-displaceably abuttingly between said radially inwardly directed projection of said barrel and said ring.

8. The device according to claim 1, wherein said tumblers enter into said annular grooves when said key means is removed from said key slot.

9. The device according to claim 1, wherein said key means is formed with a notch in back of said projection, said ring is axially aligned with and respectively extends into said notch in the fully inserted and turned condition of said key means in said key slot.

10. The device according to claim 1, wherein said ring holds said lock cylinder plug axially non-displaceably in said barrel.

11. The device according to claim 1, wherein said inner wall of said barrel is formed with an annular groove in which said O-ring is mounted.

12. The device according to claim 1, wherein said lock cylinder plug, said ring, said barrel and said O-ring are mounted with respect to each other axially non-displaceable and constitute a structural unit.

* * * * *